(12) United States Patent
Cho (10) Patent No.: US 7,764,459 B2
(45) Date of Patent: Jul. 27, 2010

(54) METHOD, MEDIUM, AND APPARATUS OPTIMIZING REPEATABLE RUN-OUT COMPENSATORS

(75) Inventor: Hyung-joon Cho, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1399 days.

(21) Appl. No.: 11/189,853

(22) Filed: Jul. 27, 2005

(65) Prior Publication Data

US 2006/0024033 A1 Feb. 2, 2006

(30) Foreign Application Priority Data

Jul. 30, 2004 (KR) ...................... 10-2004-0060146

(51) Int. Cl.
*G11B 5/596* (2006.01)
(52) U.S. Cl. .................................. 360/77.04
(58) Field of Classification Search .............. 360/77.04, 360/75, 78.04, 77.08, 78.14, 77.06, 79.09; 700/29
See application file for complete search history.

(56) References Cited

U.S. PATENT DOCUMENTS

| | | | | |
|---|---|---|---|---|
| 5,585,976 A | * | 12/1996 | Pham | 360/77.04 |
| 5,646,797 A | * | 7/1997 | Kadlec et al. | 360/75 |
| 5,675,450 A | * | 10/1997 | Kadlec | 360/78.09 |
| 5,680,272 A | * | 10/1997 | Kadlec et al. | 360/78.04 |
| 5,684,650 A | * | 11/1997 | Kadlec et al. | 360/77.06 |
| 5,914,830 A | * | 6/1999 | Kadlec et al. | 360/78.14 |
| 6,347,018 B1 | * | 2/2002 | Kadlec et al. | 360/77.08 |
| 6,404,581 B1 | * | 6/2002 | Shah | 360/75 |
| 6,504,668 B1 | * | 1/2003 | Takeuchi et al. | 360/77.04 |
| 6,745,087 B2 | * | 6/2004 | Shah | 700/29 |
| 6,859,341 B2 | * | 2/2005 | Min et al. | 360/77.04 |
| 6,937,420 B1 | * | 8/2005 | McNab et al. | 360/75 |
| 6,937,424 B2 | * | 8/2005 | Chang et al. | 360/77.04 |
| 6,999,267 B1 | * | 2/2006 | Melkote et al. | 360/77.04 |
| 7,002,767 B2 | * | 2/2006 | Annampedu et al. | 360/75 |
| 7,167,336 B1 | * | 1/2007 | Ehrlich et al. | 360/77.04 |
| 2003/0058569 A1 | | 3/2003 | Hsin | |
| 2003/0112545 A1 | | 6/2003 | Hanson et al. | |
| 2005/0201003 A1 | * | 9/2005 | Shishida et al. | 360/77.04 |

FOREIGN PATENT DOCUMENTS

| | | |
|---|---|---|
| JP | 11-353831 | 11/1999 |
| JP | 2000-137960 | 5/2000 |
| JP | 2002-230928 | 8/2002 |
| JP | 2003-249045 | 9/2003 |
| KR | 1999-024379 | 7/1998 |
| KR | 1999-0065701 | 8/1999 |

OTHER PUBLICATIONS

Japanese Office Action issued Aug. 18, 2009 corresponding to Japanese Publication No. 2005-223105.

* cited by examiner

*Primary Examiner*—Fred Tzeng
(74) *Attorney, Agent, or Firm*—Staas & Halsey LLP (57) ABSTRACT

A hard disk drive optimization method, medium, and apparatus, particularly, a method, medium, and apparatus optimizing the number and gains of RRO compensators for the hard disk drive apparatus. The PRO compensation method can includes measuring the magnitude of a position error signal (PES) at each zone on a disk while gradually increasing the number of RRO compensators applied to a corresponding zone, and determining the number of RRO compensators, with which the PES with a minimum magnitude was measured, as an optimal number of RRO compensators for the corresponding zone, based on the PES measurement results.

23 Claims, 5 Drawing Sheets

METHOD, MEDIUM, AND APPARATUS OPTIMIZING REPEATABLE RUN-OUT COMPENSATORS

CROSS-REFERENCE TO RELATED APPLICATIONS

This application claims the benefit of Korean Patent Application No. 10-2004-0060146, filed on Jul. 30, 2004, in the Korean Intellectual Property Office, the disclosure of which is incorporated herein in its entirety by reference.

BACKGROUND OF THE INVENTION

1. Field of the Invention

Embodiments of the present invention relate to a recording and/or reproducing optimization methods, media, and apparatuses, and more particularly, to a hard disk drive method, medium, and apparatus optimizing the number and gains of repeatable run-out (RRO) compensators.

2. Description of the Related Art

Various repeatable run-out (RRO) compensation techniques have been conventionally implemented, including those disclosed in Japanese Patent Laid-open Publication No. hei 15-249045, U.S. Patent Publication Nos. 2003-0058569 and 2003-112545, for example.

In general, hard disk drives, are a type of data storage device the that contributes to the operation of a computer system by reproducing data from a disc and/or writing data to the disc using a magnetic head. With increasingly high capacity, high density, and compact structures of hard disk drives, a bit per inch (BPI) indicating a density in a rotating direction of a disk and a track per inch (TPI) indicating a density in a radial direction thereof have also been increasing. As a result, controlling mechanisms with finer control capabilities are desired.

As the recording densities of hard disk drives increase, the number of tracks, for example, on a magnetic disk also gradually increases, which results in an increasing ratio of time required for recording servo information on a magnetic disk compared to the time spent manufacturing the hard disk drive, i.e., during the overall manufacture of the hard disk drive additional time is consistently being required to record servo information on the corresponding magnetic disk.

In order to solve this problem, a new hard disk drive assembly method, called an offline servo track write (STR) method, has been developed. In the offline STR method, a disk is installed in the hard disk drive after, rather than before, recording servo information thereon.

The offline STR method, however, may cause the aforementioned repeatable run-out (RRO) and thus may distort a position error signal (PES), unless the center of the disk is precisely centrally aligned with the center of the spindle motor when the disk is installed in the hard disk drive.

In order to compensate for the RRO, an RRO compensation circuit has been developed. An RRO compensation circuit can include a plurality of RRO compensators, such as a 1× RRO compensator, a 2× RRO compensator, . . . , an NX RRO compensator.

Generally, the RRO may vary depending on an assembled state of the hard disk drive and may differ from portion to portion of the disk installed in the hard disk drive.

Conventionally, however, the number and gains of RRO compensators have been assigned without considering the assembled state of the hard disk drive or the position on the disk in the hard disk drive, thereby making it almost impossible to compensate for the RRO of a PES, and eventually making servo control unstable.

In other words, when the number of RRO compensators is assigned without considering the position of the disk in the hard disk drive, the RRO along an inner portion of the disk may be under-compensated for, whereas the RRO along an outer portion of the disk may be over-compensated for. Thus, a high frequency band of a PES may be unnecessarily amplified making it impossible to precisely compensate for the RRO of the PES.

Particularly, if a fixed number of RRO compensators and a fixed level of gain is adopted, when recording final servo patterns on a reference disk on which a reference pattern has been recorded offline, in the aforementioned self servo recording method, the RRO cannot be successfully compensated for, resulting in servo control becoming unstable.

SUMMARY OF THE INVENTION

Embodiments of the present invention set forth a method, medium, and apparatus optimizing repeatable run-out (RRO) compensators, adaptively varying the number and gains of RRO compensators based on the assembled state of the hard disk drive apparatus and a portion of the disk installed in the hard disk drive apparatus.

To achieve the above and/or other aspects and advantages, embodiments of the present invention set forth a repeatable run-out (RRO) compensation method of a recording and/or reproducing apparatus, including measuring magnitudes of position error signals (PES) at each zone on a medium while varying a number of RRO compensators applied to each corresponding zone, and determining the number of RRO compensators having a measured PES magnitude, of the measured magnitudes, with a minimum magnitude to be an optimal number of RRO compensators, for each corresponding zone.

The method may further include measuring magnitudes of PES for RRO compensators of a corresponding zone while varying a gain of each RRO compensator, and determining a gain at which another measured PES magnitude, of the measured magnitudes of PES for RRO compensators, that has a minimum magnitude to be an optimal gain for a corresponding RRO compensator.

To achieve the above and/or other aspects and advantages, embodiments of the present invention set forth an repeatable run-out (RRO) compensation method of a recording and/or reproducing apparatus, including measuring magnitudes of position error signals (PES) for each RRO compensator at each corresponding zone on a medium while varying a gain of each corresponding RRO compensator applied to the corresponding zone, and determining a gain at which a measured PES magnitude, of the measured magnitudes, that has a minimum magnitude to be an optimal gain for a corresponding RRO compensator.

To achieve the above and/or other aspects and advantages, embodiments of the present invention set forth a recording and/or reproducing apparatus, including a voice coil motor (VCM) driver and actuator unit to generate a driving current corresponding to an actuator driving signal to move a head with the driving current, and to generate position error signals (PES), an estimation unit to receive the PES, obtain an estimated position, measured position, estimated velocity, and measured velocity of the head, and to generate a position error value, corresponding to a difference between the estimated position and measured position of the head, and a velocity error value, corresponding to a difference between the estimated velocity and measured velocity of the head, a feedback control circuit to generate a driving control signal based on the position error value and the velocity error value, an RRO compensation circuit to generates an RRO compensation value by adaptively determining an optimal number of RRO compensators for each zone on a medium, applying a corresponding optimal number of RRO compensators to a corresponding zone, determining optimal gains for each RRO compensator applied to the corresponding zone, and applying a corresponding optimal gain to a corresponding RRO compensator, and a summation unit to output the actuator driving signal to the VCM driver and actuator unit, the actuator driving signal corresponding to a result of a summing of the driving control signal output from the feedback control circuit and an output of the RRO compensation circuit.

The RRO compensation circuit may measure magnitudes of the PES at the corresponding zone while varying a number of RRO compensators applied to the corresponding zone, and determine the number of RRO compensators at which a measured PES magnitude, of the measured magnitudes, that has a minimum magnitude to be the optimal number of RRO compensators for the corresponding zone.

The RRO compensation circuit may also measure magnitudes of the PES at the corresponding zone while varying a gain of the corresponding RRO compensator, and determine the gain at which a measured PES magnitude, of the measured magnitudes, has a minimum magnitude to be the optimal gain for the corresponding RRO compensator.

To achieve the above and/or other aspects and advantages, embodiments of the present invention set forth a repeatable run-out (RRO) compensation method of a recording and/or reproducing apparatus, including measuring magnitudes of position error signals (PES) for RRO compensators on a medium, varying a number of RRO compensators applied to a zone of the medium, varying a gain of an RRO compensator applied to the zone, determining the number of RRO compensators having a measured PES magnitude, of the measured magnitudes, with a minimum magnitude to be an optimal number of RRO compensators, determining a gain at which another measured PES magnitude, of the measured magnitudes, that has a minimum magnitude to be an optimal gain for a corresponding RRO compensator, and applying the optimal number of RRO compensators and the optimal gain for the corresponding RRO compensator to compensate a driving current, of the recording and/or reproducing apparatus, to accurately position a head on the medium.

To achieve the above and/or other aspects and advantages, embodiments of the present invention set forth a recording and/or reproducing method, including generating a driving signal to move a head on a medium for recording and/or reproducing data to/from the medium, measuring magnitudes of position error signals (PES) for RRO compensators on the medium, varying a number of repeatable run-out (RRO) compensators applied to a zone of the medium, varying a gain of an RRO compensator applied to the zone, determining the number of RRO compensators having a measured PES magnitude, of the measured magnitudes, with a minimum magnitude to be an optimal number of RRO compensators, determining a gain at which another measured PES magnitude, of the measured magnitudes, that has a minimum magnitude to be an optimal gain for a corresponding RRO compensator, compensating the driving signal by applying the optimal number of RRO compensators and the optimal gain for the corresponding RRO compensator to accurately position the head on the medium, and recording and/or reproducing data to/from the medium.

To achieve the above and/or other aspects and advantages, embodiments of the present invention set forth a recording and/or reproducing apparatus, including a driver to generate a driving signal to move a head on a medium to record and/or reproduce data to/from the medium, and to measure magnitudes of position error signals (PES) for RRO compensators on the medium, an RRO compensation circuit to vary a number of repeatable run-out (RRO) compensators applied to a zone of the medium, vary a gain of an RRO compensator applied to the zone, determine the number of RRO compensators having a measured PES magnitude, of the measured magnitudes, with a minimum magnitude to be an optimal number of RRO compensators, determine a gain at which another measured PES magnitude, of the measured magnitudes, that has a minimum magnitude to be an optimal gain for a corresponding RRO compensator, and to apply the optimal number of RRO compensators and the optimal gain for the corresponding RRO compensator, and a compensating unit to compensate the driving signal based on an output of the RRO compensation circuit.

To achieve the above and/or other aspects and advantages, embodiments of the present invention set forth a recording and/or reproducing apparatus, including a voice coil motor (VCM) driver and actuator unit to generate a driving current corresponding to an actuator driving signal to move a head with the driving current, and to generate position error signals (PES), an RRO compensation circuit to generates an RRO compensation value by adaptively determining an optimal number of RRO compensators for each zone on the medium, applying a corresponding optimal number of RRO compensators to a corresponding zone, determining optimal gains for each RRO compensator applied to the corresponding zone, and applying a corresponding optimal gain to a corresponding RRO compensator, and a compensation unit to output the actuator driving signal to the VCM driver and actuator unit, the actuator driving signal corresponding to a result of an output of the RRO compensation circuit.

The RRO compensation circuit may measure magnitudes of the PES at the corresponding zone while varying a number of RRO compensators applied to the corresponding zone, and determine the number of RRO compensators at which a measured PES magnitude, of the measured magnitudes, that has a minimum magnitude to be the optimal number of RRO compensators for the corresponding zone.

The RRO compensation circuit may measure magnitudes of the PES at the corresponding zone while varying a gain of the corresponding RRO compensator, and determine the gain at which a measured PES magnitude, of the measured magnitudes, has a minimum magnitude to be the optimal gain for the corresponding RRO compensator.

To achieve the above and/or other aspects and advantages, embodiments of the present invention set forth at least one medium including computer readable code implementing embodiments of the present invention.

Recording and/or reproducing methods, media, apparatuses may be represented in a hard disk drive embodiment.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
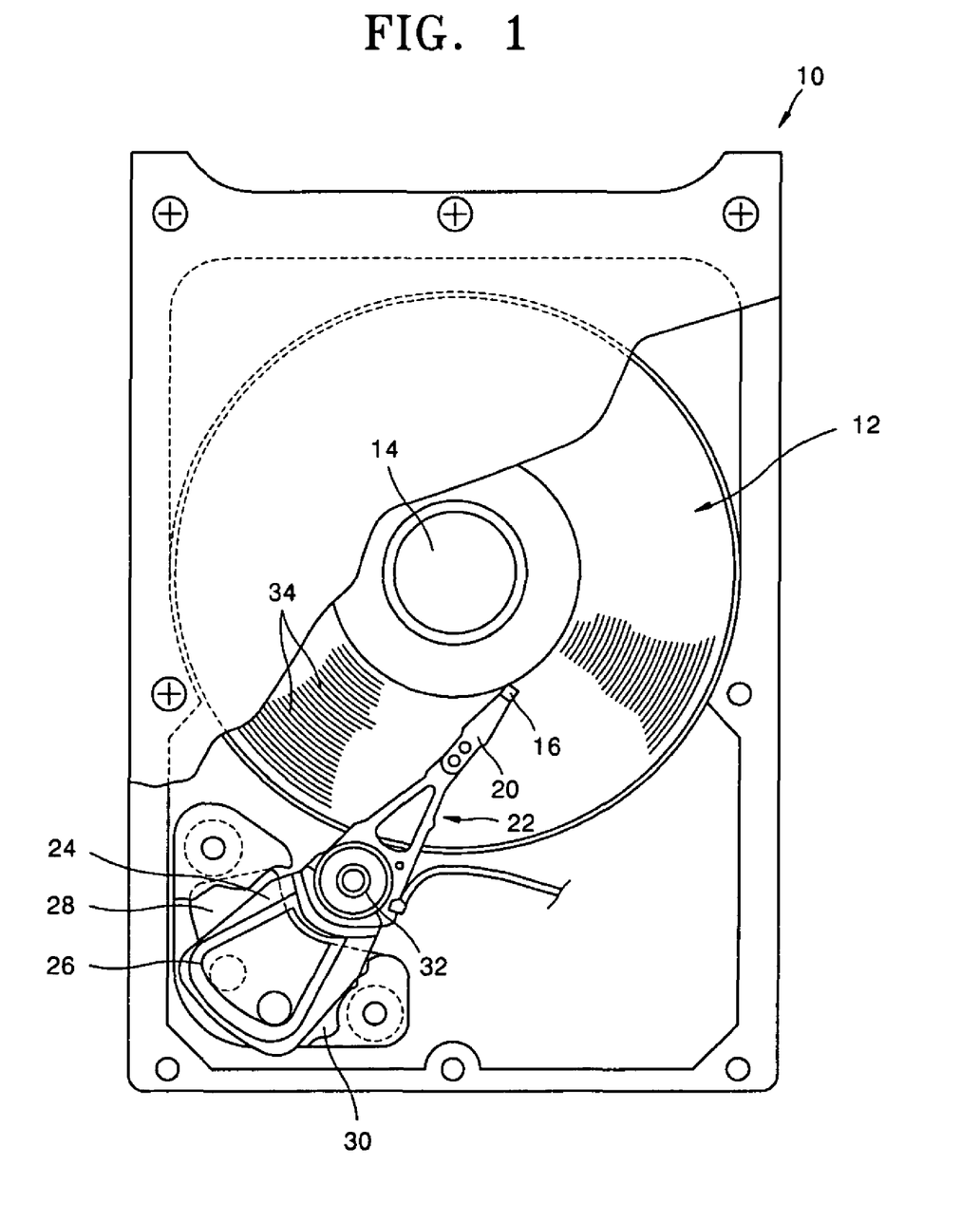
FIG. 1 illustrates a hard disk drive, to which embodiments of the present invention may be applied.

FIG. 1 illustrates an head disk assembly (HDA) 10 of a hard disk drive. The HDA 10 can include at least one magnetic disk 12, rotated by a spindle motor 14. The HDA 10 can also include a transducer (not shown), located in the vicinity of the surface of the magnetic disk 12.

When the magnetic disk 12 rotates, the transducer can read information from or write information to the disk 12 by, respectively, sensing the magnetic field of the magnetic disk 12 or magnetizing the magnetic disk 12. Generally, the transducer is associated with the surface of the disk 12. Even though the transducer may be integrated in a head 16, illustrated in FIG. 1 as a single device, the transducer could be considered as including two elements, i.e., a write transducer for writing data to the magnetic disk 12 by magnetizing the magnetic disk 12 and a read transducer for reading data from the magnetic disk 12 by sensing the magnetic field of the magnetic disk 12. The read transducer may be made of a magneto-resistive device.

The transducer may be integrated into the head 16 on a slider 20. The head 16 can have a structure such that it can generate an air bearing between the transducer and the surface of the magnetic disk 12. The head 16 can be coupled to a head gimbal assembly (HGA) 22, attached to an actuator arm 24, and may include a voice coil 26. The voice coil 26 is located in the vicinity of a magnetic assembly 28, defining a voice coil motor (VCM) 30. A current supplied to the voice coil 26 generates a torque that enables the actuator arm 24 about a bearing assembly 32. The rotation of the actuator arm 24 can thereby move the transducer across the surface of the magnetic disk 12.

Information is generally stored in each track 34, for example, on the magnetic disk 12. Each track 34, which can be circular, can include a plurality of sectors, with each sector including a data field and an identification field, for example. The identification field can include gray codes for identifying the corresponding sector and a corresponding track. The transducer can be moved across the surface of the magnetic disk 12 from one track to another track on the magnetic disk 12 to read information on or write information to the magnetic disk 12.

The operation of an electronic system of a hard disk drive, according to an embodiment of the present invention, will now be described in greater detail.

Figure 2:
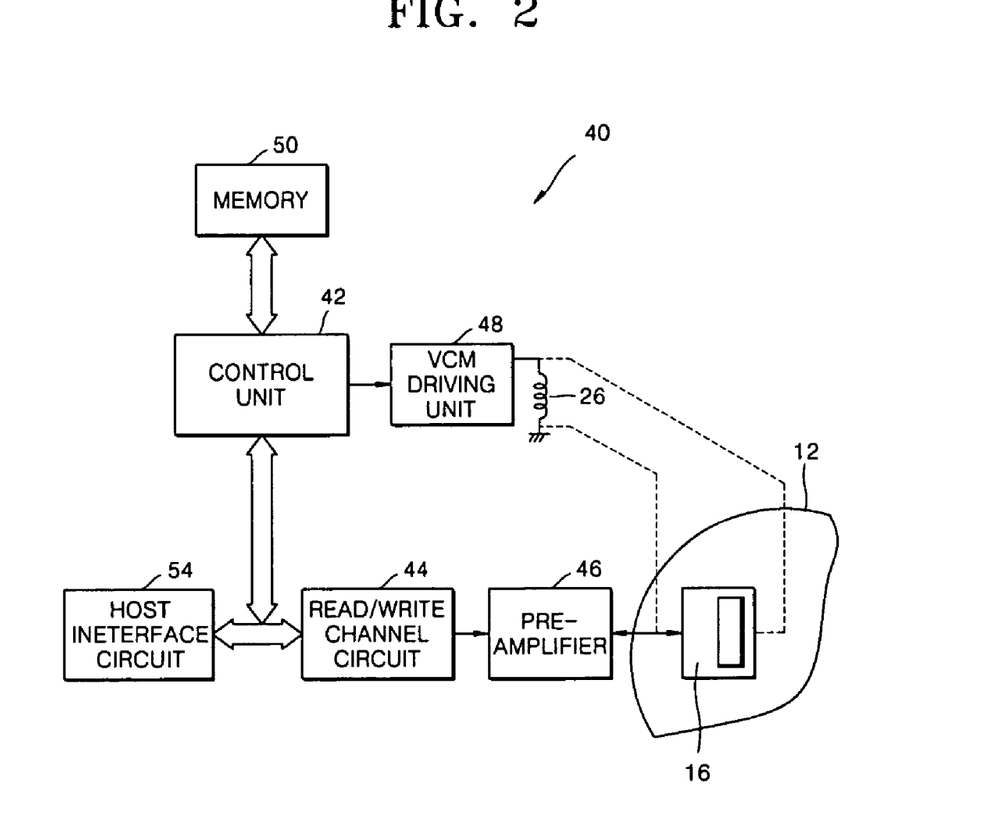
FIG. 2 illustrates a block diagram of an electronic circuit to control a hard disk drive, according to an embodiment of the present invention.

FIG. 2 illustrates a block diagram of an electronic system 40 for controlling the hard disk drive of FIG. 1, according to an embodiment of the present invention. Referring to FIG. 2, the electronic system 40 can include a control unit 42, coupled to the head 16 of the hard disk drive of FIG. 1 via a read/write channel circuit 44 and a preamplifier 46. The control unit 42 may be a digital signal processor (DSP), a microprocessor, or a microcontroller, for example. The control unit 42 can supply a control signal to the read/write channel circuit 44 in order to control the reading of data from and/or recording of data to the magnetic disk 12. Information is usually transmitted from the read/write channel circuit 44 to a host interface circuit 54. The host interface circuit 54 can include a buffer memory and a control circuit that allow the hard disk drive to interface with such a system, e.g., a personal computer.

The control unit 42 can also be coupled to a VCM driving unit 48, supplying a driving current to the voice coil 26. The control unit 42 can supply a control signal to the VCM driving circuit 48 to control the excitation of a VCM and the movement of the head 16.

The control unit 42 can control an RRO compensation circuit 340 to optimise the number and/or gains of RRO compensators for the hard disk drive, and for each portion of the magnetic disk 12, by executing programs stored in a memory 50, for example, and enable exemplary methods illustrated in FIGS. 4 and 5, described in greater detail below.

Figure 4:
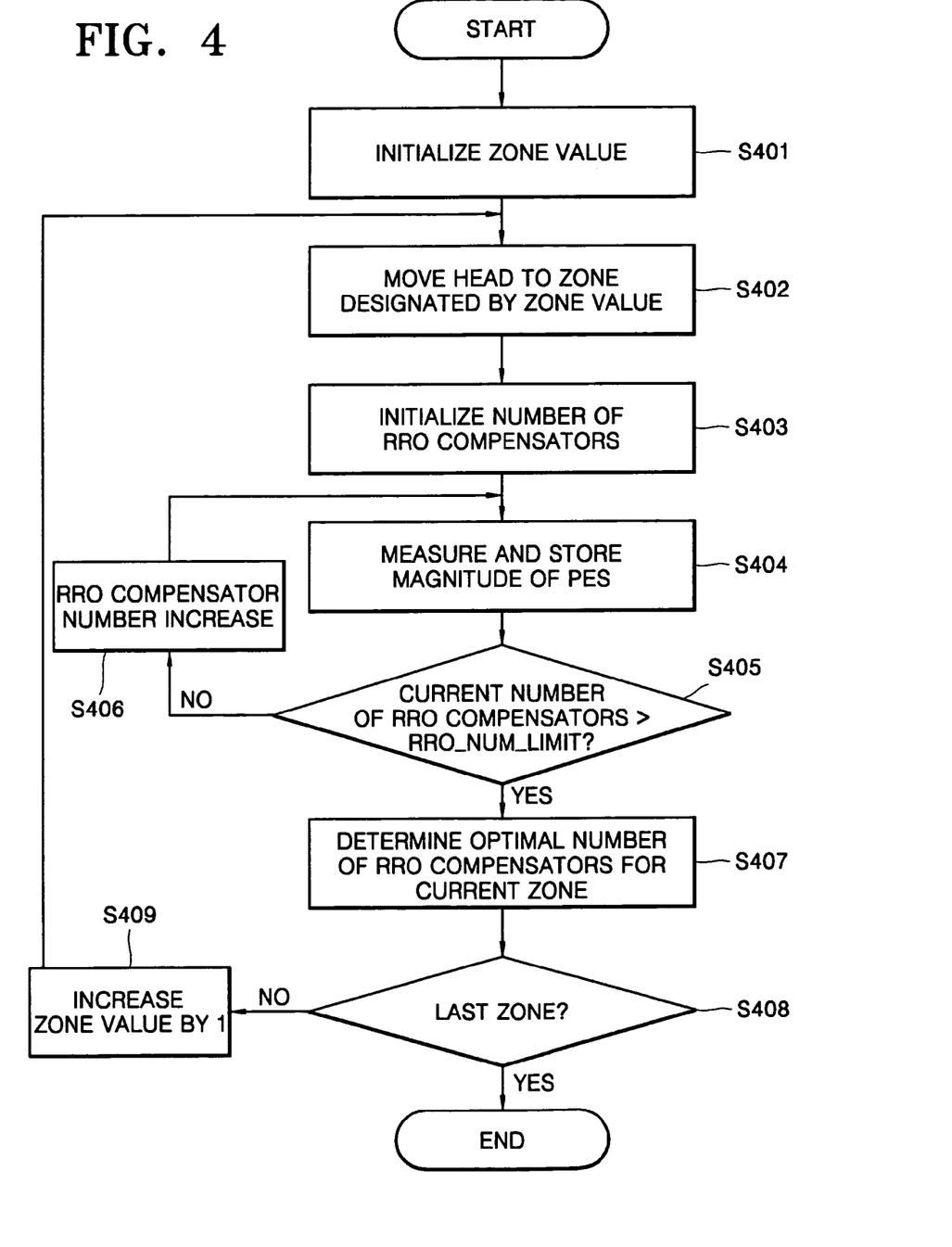
FIG. 4 illustrates a flowchart of a method of optimizing a number of RRO compensators, according to an embodiment of the present invention.
Figure 5:
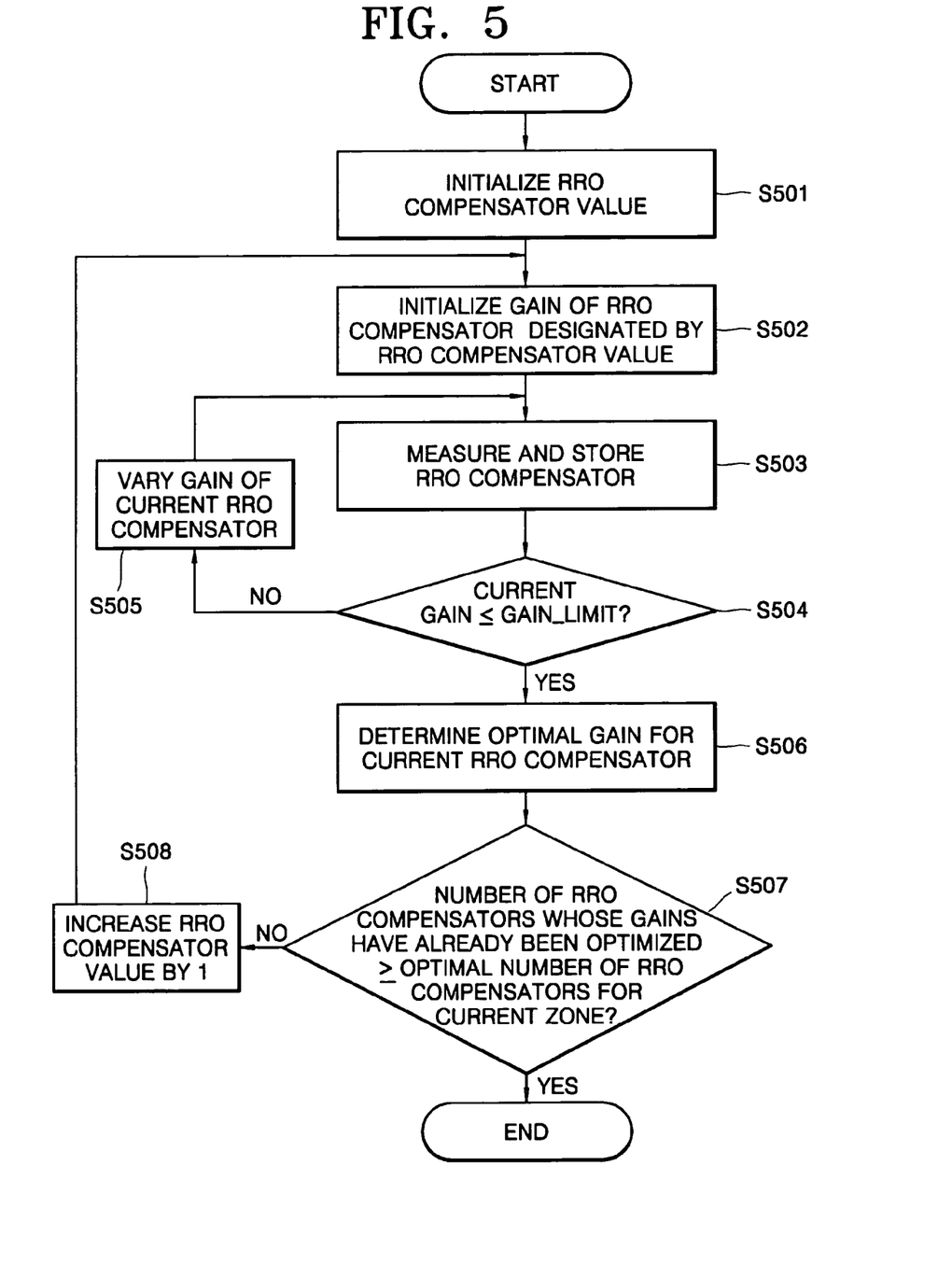
FIG. 5 illustrates a flowchart of a method of optimizing gains of RRO compensators, according to an embodiment of the present invention.

The memory 50 can store firmware and control data for controlling the hard disk drive, particularly, the memory may include a program enabling the exemplary methods illustrated in FIGS. 4 and 5, noting that embodiments of the present invention are not limited thereto.

An operation of the hard disk drive of FIG. 1 will now be described in greater detail.

As only an example, in a data read mode, the hard disk drive can enable the preamplifier 46 to amplify an electric signal sensed from the magnetic disk 12 by the transducer (e.g., the head 16) in order to facilitate the processing of the electric signal. Thereafter, the read/write channel circuit 44 can code an analog signal, i.e., the amplification result output from the preamplification unit 45, into a digital signal that can be read by a host device (not shown), converts the digital signal into stream data, and transmits the stream data to the host device via the host interface 54.

Also, as only an example, in a data write mode, the hard disk drive can receive data from the host device via the host interface circuit 54, temporarily store the received data in a buffer (not shown) inside the host interface circuit 54, sequentially output the data stored in the buffer, enable the read/write channel 44 to convert the data sequentially output from the buffer into a binary data stream and record the binary data stream on the magnetic disk 12 with a write current amplified by the preamplifier 46.

An RRO compensation circuit, included in the control unit 42, will now be described in more detail.

Figure 3:
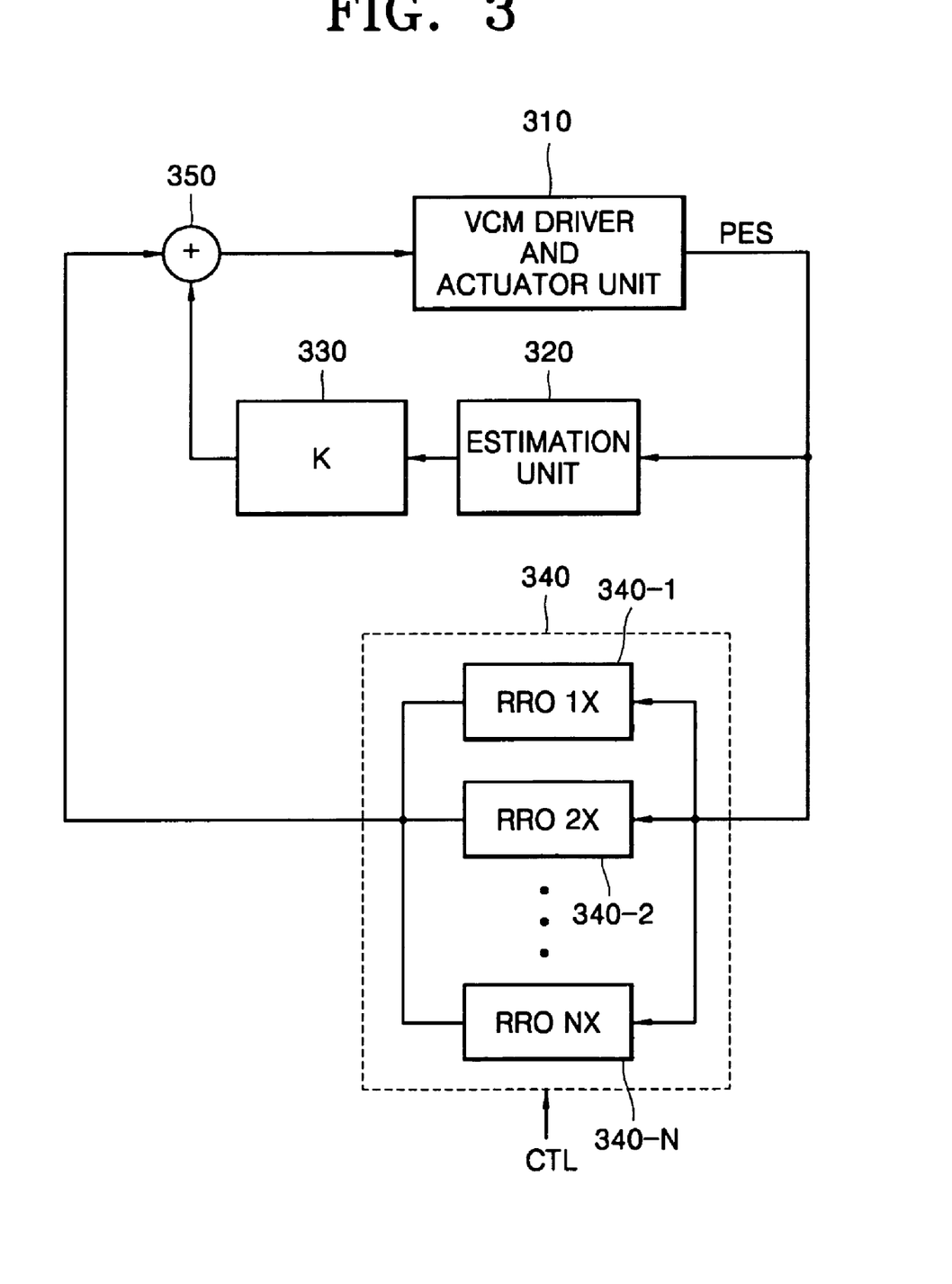
FIG. 3 illustrates a block diagram of a control circuit of a hard disk drive having an optimizing repeatable run-out (RRO) compensation circuit, according to an embodiment of the present invention.

FIG. 3 illustrates a block diagram of a control circuit of a hard disk drive, having optimized repeatable run-out (RRO) compensation, optimized according to an embodiment of the present invention. Referring to FIG. 3, the hard disk drive can include a VCM driver and actuator unit 310, an estimation unit 320, a feedback control circuit 330, an RRO compensation circuit 340, and a summation unit 350.

The VCM driver and actuator unit 310 can generate a driving current corresponding to an actuator driving signal output from the summation unit 350, move the head 16 with the driving current, and generate a position error signal (PES) while executing track-seek and track-following operations.

The estimation unit 320 can receive the PES, calculate an estimated position and estimated velocity of the head 16 and a measured position and measured velocity of the head 16 by using well-known state equations, and generate a position error value and a velocity error value, i.e., a difference between the estimated position and measured position of the head 16 and a difference between the estimated velocity and measured velocity of the head 16.

The feedback control circuit 330 can multiply the position error value and the velocity error value by the respective gain constants, generate a driving control signal using the multiplication results, and output the driving control signal to the summation unit 350.

The RRO compensation circuit 340 can include a plurality of RRO compensators, e.g., an RRO 1× compensator 340-1, an RRO 2× compensator 340-2, . . . , and an RRO NX compensator 340-N. The RRO 1× compensator 340-1 is designed to compensate for 1× RRO components, and the RRO 2× compensator 340-2 is designed to compensate for 2× RRO components.

Examples of RRO compensation can be found in Korean Patent Laid-open Publication Nos. 1999-0065701 and 1998-024379.

In embodiments of the present embodiment, the RRO compensation circuit 340 can be designed so that it can optimize the number and/or gains of RRO compensators for each zone on the magnetic disk 12.

The RRO compensation circuit 340 can optimize the number and/or gains of RRO compensators in response to a control signal CTL corresponding to the position of the head 16 on the magnetic disk 12, for example.

The summation unit 350 can generate the actuator driving signal, corresponding to a result of the summing the driving control signal output from the feedback control circuit 330 and an RRO compensation value for the PES generated by the RRO compensation circuit 340, and output the actuator driving signal to the VCM driver and actuator unit 310.

Methods of optimizing the number and/or gains of RRO compensators, on a zone-by-zone basis, and according to an embodiment of the present invention, will now be described in greater detail.

First, a method of optimizing the number of RRO compensators on a zone-by-zone, basis under the control of the control unit 42, will be described in detail with reference to FIG. 4. Referring to FIG. 4, in operation S401, a zone value, designating a zone to be measured (hereinafter referred to as current zone), is initialized. When the head 16 moves from an outer circumferential portion to an inner circumferential portion of the magnetic disk 12, the position of a central track in an outermost zone can be set as the zone value.

In operation S402, the head 16 is moved to the current zone, a zone designated by the zone value.

In operation S403, the number of RRO compensators to be applied to the current zone is initialized to a predetermined number. The predetermined number is a minimum number of RRO compensators required for RRO compensation regardless of where on the magnetic disk 12 the current zone is located. For example, the predetermined number may be 4.

In operation S404, the magnitude of a PES can be measured and then stored while operating the current number of PRO compensators.

In operation S405, the current number of PRO compensators can be compared with a maximum number PRO_NUM_LIMIT of RRO compensators that can be supported by the hard disk drive.

In operation S406, if the current number of PRO compensators is smaller than the maximum number PRO_NUM_LIMIT of RRO compensators, the current number of PRO compensators can be increased by 1, for example, and the method can return to operation S404.

In operation S407, if the current number of PRO compensators is not smaller than the maximum number PRO_NUM_LIMIT of RRO compensators, PES magnitudes that have been measured and stored while gradually increasing the number of RRO compensators from the predetermined number are compared, and one of the number of RRO compensators having a corresponding minimum PES magnitude is determined to be the optimal number of RRO compensators for the current zone, in operation S407.

In operation S408, it can be determined whether the current zone is a last zone LAST_Zone on the magnetic disk 12.

Here, in operation S409, if the current zone is not the last zone LAST_Zone, the zone value is increased by 1, for example, and the method can return to operation S402.

In operation S408, if the current zone is the last zone LAST_Zone, then the optimal number of RRO compensators for every zone on the magnetic disk 12 should have accordingly been determined, meaning the optimizing method may be complete.

As described above, the magnitude of each PES is measured at each zone on the magnetic disk 12, while gradually increasing the number of RRO compensators, and then the one number of RRO compensators having the corresponding minimum PES is determined to be the optimal number of RRO compensators for each corresponding zone. Accordingly, the number of RRO compensators can be optimized on a zone-by-zone basis.

A method of optimizing the gains of RRO compensators on a zone-by-zone basis, after optimizing the number of RRO compensators on a zone-by-zone basis, will be described next with reference to FIG. 5. Referring to FIG. 5, in operation S501, an RRO compensator value, designating one of the RRO compensators applied to a current zone, which is to be measured first thereamong, is initialized. The RRO compensator designated by the RRO compensator value will now be referred to as the current RRO compensator. For example, the RRO compensator value may be set to designate the RRO 1× compensator 340-1, which would be considered the current RRO compensator.

In operation S502, an initial gain value of a current gain value is set to be equal to, for example, a maximum gain value supported by the current RRO compensator.

In operation S503, the magnitude of a PES is measured and then stored, while operating the current RRO compensator with the current gain value.

In operation S504, the current gain value is then compared with a minimum gain value GAIN_LIMIT supported by the current RRO compensator.

In operation S505, if the current gain value is greater than the minimum gain value GAIN_LIMIT, the current gain value can be reduced by a predetermined amount, and the method may then return to operation S503.

In operation S506, if the current gain value is not greater than the minimum gain value GAIN_LIMIT, PES magnitudes measured and stored while gradually reducing the gain of the current RRO compensator are compared, and the gain of the current RRO compensator having a minimum PES magnitude can be determined to be the optimal gain for the current RRO compensator.

In operation S507, the number of RRO compensators whose gains have been optimized is compared with corresponding optimal number of RRO compensators for the current zone.

In operation S508, if the number of RRO compensators whose gains have already been optimized is smaller than the corresponding optimal number of RRO compensators for the current zone, the RRO compensator value is increased by 1, for example, and the method returns to operation S502 so that another round of gain optimization can be performed for the next RRO compensator, as designated by the resulting RRO compensator value.

If the number of RRO compensators whose gains have already been optimised is not smaller than the corresponding optimal number of RRO compensators for the current zone, then all of the RRO compensators applied to the current zone will have already been gain-optimized, i.e., the method may be complete.

Accordingly, the gains of each of the RRO compensators 340-1, 340-2, . . . , 340-N of the RRO compensation circuit 340 can be optimized on a zone-by-zone basis by repeatedly measuring the magnitude of each measured PES while gradually varying the gain of each RRO compensator applied to each zone on the magnetic disk 12, and by determining the gain at which the PES with a minimum magnitude was measured to be the optimal gain, for each RRO compensator applied to each zone.

By using such exemplary methods of FIGS. 4 and 5, an optimal number of RRO compensators and optimal gain of each RRO compensator can be determined on a zone-by-zone basis.

When applied to a self-servo recording method, in which a final servo pattern is recorded on a disk where a reference pattern has been recorded offline, embodiments of the present invention can precisely compensate for RRO components in a PES.

As described above, according to embodiments of the present invention, it is possible to achieve precise RRO compensation and perform stable servo control, regardless of an assembled state of a hard disk drive and a portion of a disk, installed in the hard disk drive, by appropriately optimizing the number and/or gains of RRO compensators applied to each zone on the disk on a zone-by-zone basis.

Embodiments of the present invention can be embodied as a method, an apparatus, or a system. When embodied as computer readable code/instructions, e.g., software, elements of embodiments of the present invention may be implemented by code segments, for example. Programs and/or the code segments may be stored in a medium, e.g., a computer-readable recording medium, and/or may be transmitted through a transmission medium and/or over a communications network as computer data signals associated with carrier waves. Examples of the medium may include nearly all kinds of media for storing and/or transmitting data. For example, examples of the medium can include at least an electronic circuit, a semiconductor memory device, a ROM, a flash memory, an erasable ROM, a floppy disk, an optical disk, a hard disk, an optical fiber medium, and a radio frequency (RF) network, etc. Examples of computer data signals include nearly all types of signals that are storable and/or transmittable on such a storage/transmission medium as an electronic network channel, an optical fiber, air, an electromagnetic system, and an RF network, for example.

Embodiments of the present invention can also be applied not only to various disk drives, such as hard disk drives, but to other types of data storage devices.

Thus, although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A repeatable run-out (RRO) compensation method of a recording and/or reproducing apparatus, comprising:
    measuring magnitudes of position error signals (PES) at each zone on a medium while varying a number of RRO compensators applied to each corresponding zone; and
    determining the number of RRO compensators having a measured PES magnitude, of the measured magnitudes, with a minimum magnitude to be an optimal number of RRO compensators, for each corresponding zone.

2. The RRO compensation method of claim 1, further comprising:
    measuring magnitudes of PES for RRO compensators of a corresponding zone while varying a gain of each RRO compensator, and determining a gain at which another measured PES magnitude, of the measured magnitudes of PES for RRO compensators, that has a minimum magnitude to be an optimal gain for a corresponding RRO compensator.

3. At least one medium comprising computer readable code implementing the method of claim 1.

4. The method of claim 1, wherein the recording and/or reproducing apparatus is a hard disk drive.

5. An repeatable run-out (RRO) compensation method of a recording and/or reproducing apparatus, comprising:
    measuring magnitudes of position error signals (PES) for each RRO compensator at each corresponding zone on a medium while varying a gain of each corresponding RRO compensator applied to the corresponding zone; and
    determining a gain at which a measured PES magnitude, of the measured magnitudes, that has a minimum magnitude to be an optimal gain for a corresponding RRO compensator.

6. At least one medium comprising computer readable code implementing the method of claim 5.

7. The method of claim 5, wherein the recording and/or reproducing apparatus is a hard disk drive.

8. A recording and/or reproducing apparatus, comprising:
    a voice coil motor (VCM) driver and actuator unit to generate a driving current corresponding to an actuator driving signal to move a head with the driving current, and to generate position error signals (PES);
    an estimation unit to receive the PES, obtain an estimated position, measured position, estimated velocity, and measured velocity of the head, and to generate a position error value, corresponding to a difference between the estimated position and measured position of the head, and a velocity error value, corresponding to a difference between the estimated velocity and measured velocity of the head;
    a feedback control circuit to generate a driving control signal based on the position error value and the velocity error value;
    an RRO compensation circuit to generates an RRO compensation value by adaptively determining an optimal number of RRO compensators for each zone on a medium, applying a corresponding optimal number of RRO compensators to a corresponding zone, determining optimal gains for each RRO compensator applied to the corresponding zone, and applying a corresponding optimal gain to a corresponding RRO compensator; and
    a summation unit to output the actuator driving signal to the VCM driver and actuator unit, the actuator driving signal corresponding to a result of a summing of the driving control signal output from the feedback control circuit and an output of the RRO compensation circuit.

9. The apparatus of claim 8, wherein the RRO compensation circuit measures magnitudes of the PES at the corresponding zone while varying a number of RRO compensators applied to the corresponding zone, and determines the number of RRO compensators at which a measured PES magnitude, of the measured magnitudes, that has a minimum magnitude to be the optimal number of RRO compensators for the corresponding zone.

10. The apparatus of claim 8, wherein the RRO compensation circuit measures magnitudes of the PES at the corresponding zone while varying a gain of the corresponding RRO compensator, and determines the gain at which a measured PES magnitude, of the measured magnitudes, has a minimum magnitude to be the optimal gain for the corresponding RRO compensator.

11. The apparatus of claim 8, wherein the recording and/or reproducing apparatus is a hard disk drive.

12. A repeatable run-out (RRO) compensation method of a recording and/or reproducing apparatus, comprising:
    measuring magnitudes of position error signals (PES) for RRO compensators on a medium;
    varying a number of RRO compensators applied to a zone of the medium;
    varying a gain of an RRO compensator applied to the zone;
    determining the number of RRO compensators having a measured PES magnitude, of the measured magnitudes, with a minimum magnitude to be an optimal number of RRO compensators;
    determining a gain at which another measured PES magnitude, of the measured magnitudes, that has a minimum magnitude to be an optimal gain for a corresponding RRO compensator; and
    applying the optimal number of RRO compensators and the optimal gain for the corresponding RRO compensator to compensate a driving current, of the recording and/or reproducing apparatus, to accurately position a head on the medium.

13. At least one medium comprising computer readable code implementing the method of claim 12.

14. The method of claim 12, wherein the recording and/or reproducing apparatus is a hard disk drive.

15. A recording and/or reproducing method, comprising:
    generating a driving signal to move a head on a medium for recording and/or reproducing data to/from the medium,
    measuring magnitudes of position error signals (PES) for RRO compensators on the medium;
    varying a number of repeatable run-out (RRO) compensators applied to a zone of the medium;
    varying a gain of an RRO compensator applied to the zone;
    determining the number of RRO compensators having a measured PES magnitude, of the measured magnitudes, with a minimum magnitude to be an optimal number of RRO compensators;
    determining a gain at which another measured PES magnitude, of the measured magnitudes, that has a minimum magnitude to be an optimal gain for a corresponding RRO compensator;
    compensating the driving signal by applying the optimal number of RRO compensators and the optimal gain for the corresponding RRO compensator to accurately position the head on the medium; and
    recording and/or reproducing data to/from the medium.

16. At least one medium comprising computer readable code implementing the method of claim 15.

17. The method of claim 15, wherein the recording and/or reproducing apparatus is a hard disk drive.

18. A recording and/or reproducing apparatus, comprising:
    a driver to generate a driving signal to move a head on a medium to record and/or reproduce data to/from the medium, and to measure magnitudes of position error signals (PES) for RRO compensators on the medium;
    an RRO compensation circuit to vary a number of repeatable run-out (RRO) compensators applied to a zone of the medium, vary a gain of an RRO compensator applied to the zone, determine the number of RRO compensators having a measured PES magnitude, of the measured magnitudes, with a minimum magnitude to be an optimal number of RRO compensators, determine a gain at which another measured PES magnitude, of the measured magnitudes, that has a minimum magnitude to be an optimal gain for a corresponding RRO compensator, and to apply the optimal number of RRO compensators and the optimal gain for the corresponding RRO compensator; and
    a compensating unit to compensate the driving signal based on an output of the RRO compensation circuit.

19. The apparatus of claim 18, wherein the recording and/or reproducing apparatus is a hard disk drive.

20. A recording and/or reproducing apparatus, comprising:
    a voice coil motor (VCM) driver and actuator unit to generate a driving current corresponding to an actuator driving signal to move a head with the driving current, and to generate position error signals (PES);
    an RRO compensation circuit to generates an RRO compensation value by adaptively determining an optimal number of RRO compensators for each zone on the medium, applying a corresponding optimal number of RRO compensators to a corresponding zone, determining optimal gains for each RRO compensator applied to the corresponding zone, and applying a corresponding optimal gain to a corresponding RRO compensator; and
    a compensation unit to output the actuator driving signal to the VCM driver and actuator unit, the actuator driving signal corresponding to a result of an output of the RRO compensation circuit.

21. The apparatus of claim 20, wherein the RRO compensation circuit measures magnitudes of the PES at the corresponding zone while varying a number of RRO compensators applied to the corresponding zone, and determines the number of RRO compensators at which a measured PES magnitude, of the measured magnitudes, that has a minimum magnitude to be the optimal number of RRO compensators for the corresponding zone.

22. The apparatus of claim 20, wherein the RRO compensation circuit measures magnitudes of the PES at the corresponding zone while varying a gain of the corresponding RRO compensator, and determines the gain at which a measured PES magnitude, of the measured magnitudes, has a minimum magnitude to be the optimal gain for the corresponding RRO compensator.

23. The apparatus of claim 20, wherein the recording and/or reproducing apparatus is a hard disk drive.

\* \* \* \* \*